United States Patent Office 2,801,248
Patented July 30, 1957

2,801,248

4-PYRIDOXYLAMINO-3-ISOXAZOLIDONE COMPOUNDS

Karl A. Folkers, Plainfield, N. J., assignor to Merck & Co., Inc., Rahway, N. J., a corporation of New Jersey No Drawing. Original application May 3, 1955, Serial No. 505,829, now Patent No. 2,776,296, dated January 1, 1957. Divided and this application March 2, 1956, Serial No. 568,991

12 Claims. (Cl. 260—296)

This invention relates to pyridoxal derivatives and particularly to 4-pyridoxylamino-3-isoxazolidone compounds and to processes for preparing these compounds.

In accordance with the invention 4-pyridoxylamino-3-isoxazolidone compounds can be prepared having the structural formula:

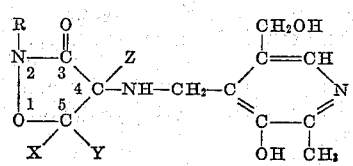

wherein X, Y and Z are hydrogen or hydrocarbon groups such as alkyl, aralkyl or aryl groups containing from one to eight carbon atoms and can be the same or different groups and R is hydrogen or a hydrocarbon group such as alkyl or aralkyl groups containing from one to eight carbon atoms. Examples of these 4-pyridoxylamino-3-isoxazolidone compounds are DL-4-pyridoxylamino-3-isoxazolidone, L-4-pyridoxylamino - 3 - isoxazolidone, D-4-pyridoxylamino-3-isoxazolidone, 4-pyridoxylamino - 2-methyl-3-isoxazolidone, 4 - pyridoxylamino - 5 - methyl-3-isoxazolidone, 4-pyridoxylamino-2, 5-dimethyl-3-isoxazolidone, 4-pyridoxylamino-5,5-dimethyl - 3 - isoxazolidone, 4-pyridoxylamino - 2,5,5 - trimethyl - 3 - isoxazolidone, 4-pyridoxylamino-2-propyl-3-isoxazolidone, 4-pyridoxylamino-5-butyl-3-isoxazolidone, 4-pyridoxylamino-2-ethyl-5-methyl-3-isoxazolidone, 4-pyridoxylamino-2-benzyl - 3 - isoxazolidone and 4-pyridoxylamino-5-benzyl-3-isoxazolidone.

The 4-pyridoxylamino-3-isoxazolidone compounds are prepared by reacting pyridoxal with a 4-amino-3-isoxazolidone compound to form the corresponding 4-pyridoxylideneamino compound which is then hydrogenated to produce the secondary amine. These reactions can be chemically represented as follows:

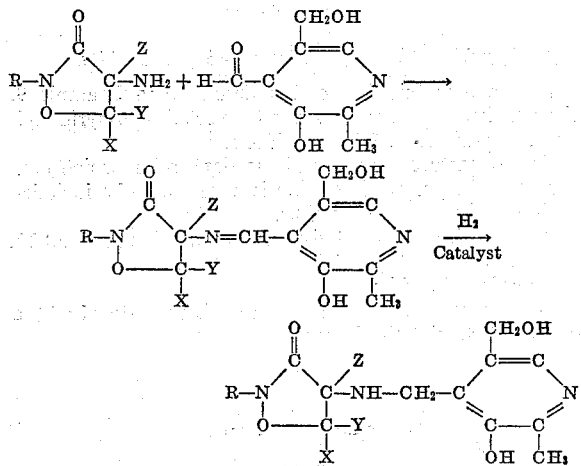

wherein X, Y, Z and R are as defined above.

The reaction between pyridoxal and the 4-amino-3-isoxazolidone compound is conveniently conducted at reflux temperature in the solvent for the reactants. It is preferred to carry out the reaction in a temperature range of about 35 to 85° C. although higher and lower temperatures can be used. The preferred solvents are lower alcohols such as, methanol, ethanol, propanol and isopropanol since in these mediums the product readily crystallizes from solution and also their boiling points are within the preferred reaction temperature. Other solvents can be used, however, with the only limitation being that they must be inert under the conditions of the reaction. The reaction ordinarily takes place quickly, or within a few minutes of bringing the reactants together in solution particularly when the temperature is above 50° C. The product can be isolated by filtration if the product crystallizes from the solution or by exaporating the reaction mixture to dryness and subsequent recrystallization. Typical examples of 4-pyridoxylideneamino-3-isoxazolidone compounds which can be prepared are 4-pyridoxylideneamino-3-isoxazolidone, DL-4-pyridoxylideneamino-3-isoxazolidone, D-4-pyridoxylideneamino-3-isoxazolidone, L-4-pyridoxylideneamino-3-isoxazolidone, 4-pyridoxylideneamino-2-methyl-3-isoxazolidone, 4-pyridoxylideneamino-2, 5-dimethyl-3-isoxazolidone, 4-pyridoxylideneamino-5, 5-dimethyl-3-isoxazolidone, 4-pyridoxylideneamino-2-propyl-3-isoxazolidone, 4-pyridoxylamino-5-butyl - 3 - isoxazolidone, 4-pyridoxylamino-2-ethyl-5-methyl-3-isoxazolidone, 4-pyridoxylamino-2-benzyl-3-isoxazolidone and 4-pyridoxylamino-5-benzyl-3-isoxazolidone.

The 4-pyridoxylideneamino-3-isoxazolidone compound can be reacted with hydrogen in the presence of a hydrogenation catalyst to produce the corresponding 4-pyridoxylamino-3-isoxazolidone compound. The process is preferably carried out by dissolving or suspending the 4-pyridoxylideneamino-3-isoxazolidene compound in a suitable solvent, such as the lower alcohols, as for example methanol, ethanol, propanol, isopropanol and butanol; the lower alkyl ethers, as for example ethyl ether, methyl ethyl ether, dimethyl ether; or water. A hydrogenation catalyst is then added to the solution and the solution is agitated in the presence of hydrogen preferably under slight positive pressure. The hydrogenation is usually complete in about thirty minutes, although occasionally longer times of up to two hours can be required. When the reduction is complete, the 4-pyridoxylamino-3-isoxazolidone compound can be separated from the reaction mixture by first removing the catalyst and then evaporating the solvent from the reaction mixture. The product can be further purified by recrystallizing from a suitable solvent.

The hydrogenation catalyst is preferably used in the range of about 1 to 10% by weight based on the weight of the 4-pyridoxylidene amino-3-isoxazolidone compound, although additional catalyst can be used if desired. Any of the usual hydrogenation catalysts can be used, preferably Raney nickel or noble metal catalyst, such as those of the platinum group and they can be supported on various carriers, as for example palladium supported on charcoal or palladium supported on barium carbonate or calcium carbonate and platinum or platinum oxide.

The reaction can be carried out by using hydrogen at atmospheric or superatmospheric pressure, but it is preferably carried out slightly above atmospheric pressure (ca 1 to 3 atmosphere). The temperature of the reaction can be varied, but normal room temperature, about 20-30° C. is preferred.

Typical examples of 4-amino-3-isoxazolidone compounds which can be used for the starting material are DL-4-amino-3-isoxazolidone, L-4-amino-3-isoxazolidone, D - 4 - amino - 3 - isoxazolidone, 2 - methyl - 4-amino-3-isoxazolidone, 4 amino - 5 - methyl - 3-isoxazolidone, 2-methyl-4-amino-5-methyl-3-isoxazolidone, 4-amino-5,5- dimethyl-3-isoxazolidone, 2-methyl-4-amino-5,5-dimethyl-3-isoxazolidone, 2-propyl-4-amio-3-isoxazolidone, 4-amino-5-butyl-3-isoxazolidone, 2-ethyl-4-amino-5-methyl-3-isoxazolidone, 2-benzyl-4-amino-3-isoxazolidone and 4-amino-5-benzyl-3-isoxazolidone.

Both the 4-pyrodixyl amino-3-isoxazolidone compounds and the 4-pyridoxylidene-amino-3-isoxazolidone compounds are useful as bactericidal and/or bacteriostatic agents. This makes them particularly useful in sterilizing laboratory equipment. They are also of value as growth promoting agents in animals. As an example the addition of these compounds to the diet of pigs materially increase their growth. These compounds may also be useful as antibacterial agents since they appear to have pronounced activity against a large number of both gram-positive and gram-negative bacteria.

The following examples are given for the purposes of illustration:

EXAMPLE 1

4-pyridoxylidene-amino-3-isoxazolidone

Forty-two grams (0.25 mole of pyridoxal is dissolved in two liters of hot methanol. To the hot solution is added 26 grams (0.25 mole) of 4-amino-3-isoxazolidone, and the mixture heated under reflux for about three minutes. The resulting solution is immediately chilled, whereupon 4-pyridoxylidene-amino-3-isoxazolidone begins to crystallize. After several hours the product is filtered, washed, and dried. The yield of 4-pyridoxylidene-amino-3-isoxazolidone is 37 grams (64% of theory), melting point 143–146° C., $[\alpha]_D^{23}+56°$ (C, 0.355, H$_2$O).

Anal.—calc'd for C$_{11}$H$_{13}$N$_3$O$_4$ C, 52, 59; H, 5.22: N, 16.73. Found C, 52, 82: H, 5.17; N, 16.15.

EXAMPLE 2

DL-4-pyridoxylidene-amino-3-isoxazolidone

Approximately 0.2 mole of pyridoxal is dissolved in two liters of hot methanol. Approximately 0.25 mole of DL-4-amino-3-isoxazolidone is added to the hot solution and the mixture heated under reflux for approximately three minutes. The resulting solution is immediately chilled whereupon DL-4-pyridoxylidene-amino-3-isoxazolidone begins to crystallize. After several hours the product is filtered, washed, and dried.

EXAMPLE 3

L-4-pyridoxylideneamino-3-isoxazolidone

Approximately 0.2 mole of pyridoxal is dissolved in two liters of hot methanol. Approximately 0.25 mole of L-4-amino-3-isoxazolidone is added to the hot solution and the mixture heated under reflux for approximately three minutes. The resulting solution is immediately chilled whereupon L-4-pyridoxylidene-amino-3-isoxazolidone begins to crystallize. After several hours the product is filtered, washed and dried. The product has a melting point of 143–144° C. and has an optical rotation of $[\alpha]_D^{23}-56°$.

EXAMPLE 4

4-pyridoxylideneamino-5,5-dimethyl-3-isoxazolidone

Approximately 0.2 mole of pyridoxal is dissolved in two liters of hot methanol. Approximately 0.25 mole of 4-amino-5,5-dimethyl-3-isoxazolidone is added to the hot solution and the mixture heated under reflux for approximately three minutes. The resulting solution is immediately chilled whereupon 4-pyridoxylidene-amino-5,5-dimethyl-3-isoxazolidone begins to crystallize. After several hours the product is filtered, washed and dried.

EXAMPLE 5

4-pyridoxylideneamino-5-methyl-3-isoxazolidone

Approximately 0.2 of pyridoxal is dissolved in two liters of hot methanol. Approximately 0.25 mole of 4-amino-5-methyl-3-isoxalizolidone is added to the hot solution and the mixture heated under reflux for approximately three minutes. The resulting solution is immediately chilled whereupon 4-pyridoxylidene-amino-5-methyl-3-isoxazolidone begins to crystallize. After several hours the product is filtered, washed and dried.

EXAMPLE 6

4-pyridoxylamino-3-isoxazolidone

A solution of DL-4-pyridoxylidene-amino-3-isoxazolidone in methanol is hydrogenated at room temperature and atmospheric pressure using 5% palladium supported on charcoal as a catalyst. After fifteen minutes the product 4-pyridoxyl-amino-3-isoxazolidone is separated by removing the catalyst by filtration and concentrate the solution to dryness.

EXAMPLE 7

L-4-pyridoxylamino-3-isoxazolidone

A 10.12 gram sample of L-4-pyridoxylidene-amino-3-isoxazolidone is suspended in 550 cc. of absolute methanol. The solution is then shaken under two to three atmospheres of hydrogen with 0.3 gram of Raney nickel catalyst. The theoretical amount of hydrogen is absorbed in approximately seven minutes. The catalyst is then removed from the solution by filtration and the solution concentrated to dryness to yield L-4-pyridoxyl-amino-3-isoxazolidone.

EXAMPLE 8

D-4-pyridoxylamino-3-isoxazolidone

A solution of 5.4 grams of D-4-pyridoxylidene-amino-3-isoxazolidone in 200 cc. of absolute alcohol is shaken with 0.15 gram of Adams' platinum catalyst under two or three atmospheres of hydrogen. The hydrogenation requires a little over one hour. The catalyst is removed by filtration and the filtrate concentrated to dryness under diminished pressure to yield D-4-pyridoxylamino-3-isoxazolidone.

EXAMPLE 9

4-pyridoxylamino-5-methyl-3-isoxazolidone

A 5.4 gram sample of 4-pyridoxylidene-amino-5-methyl-3-isoxazolidone is suspended in 300 cc. of absolute methanol and 0.3 gram of Adams' platinum catalyst is shaken under two to three atmospheres of hydrogen until approximately the theoretical amount of hydrogen has been absorbed. The reaction requires fifteen minutes for completion. The product 4-pyridoxyl-amino-5-methyl-3-isoxazolidone is recovered from the reaction mixture by filtering to remove the catalyst and concentrating the solution under diminished pressure.

EXAMPLE 10

4-pyridoxylamino-5,5-dimethyl-3-isoxazolidone

In a manner similar to that described in Example 9, the product of Example 4 was converted to 4-pyridoxyl-amino-5,5-dimethyl-3-isoxazolidone.

Any departure from the above description which conforms to the present invention is intended to be included within the scope of the claims.

This application is a division of application SN505,829, now Patent No. 2,776,296.

What is claimed is:

1. A process which comprises reacting pyridoxal with a compound having the formula—

$$\begin{array}{c} O \\ \parallel \\ C \\ / \quad \backslash \\ R-N \qquad C-NH_2 \\ | \qquad | \\ O \rule{1cm}{0.4pt} C-Y \\ | \\ X \end{array}$$

wherein X, Y, Z and R are selected from the group consisting of hydrogen and alkyl groups containing less than nine carbon atoms to produce the corresponding pyridoxylidene compound having the formula—

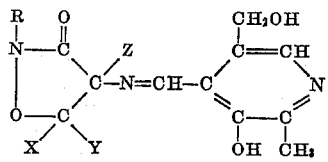

wherein X, Y, Z and R are as defined above.

2. A process which comprises reacting pyridoxal with 4-amino-3-isoxazolidone to produce 4-pyridoxylidene-amino-3-isoxazolidone.

3. A process which comprises reacting pyridoxal with L-4-amino-3-isoxazolidone to produce L-4-pyridoxylidene-amino-3-isoxazolidone.

4. A process which comprises reacting pyridoxal with D-4-amino-3-isoxazolidone to produce D-4-pyridoxylidene-amino-3-isoxazolidone.

5. A process which comprises reacting pyridoxal with 4-amino-5-methyl-3-isoxazolidone to produce 4-pyridoxylidene amino-5-methyl-3-isoxazolidone.

6. A process which comprises reacting pyridoxal with 4-amino-5,5-dimethyl-3-isoxazolidone to produce 4-pyridoxylideneamino-5,5-dimethyl-3-isoxazolidone.

7. A compound having the formula—

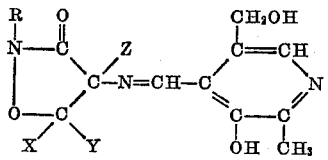

wherein X, Y, Z and R are selected from the group consisting of hydrogen and alkyl groups containing less than nine carbon atoms.

8. 4-pyridoxylidene-amino-3-isoxazolidone.
9. D-4-pyridoxylidene-amino-3-isoxazolidone.
10. L-4-pyridoxylidene-amino-3-isoxazolidone.
11. 4-pyridoxylideneamino-5-methyl-3-isoxazolidone.
12. 4 - pyridoxylideneamino - 5,5 - dimethyl - 3 - isoxazolidone.

No references cited.